United States Patent Office 2,842,545
Patented July 8, 1958

2,842,545

PROCESS FOR THE MANUFACTURE OF α:β-DI-[ARYLOXAZOLYL-(2)]-ETHYLENE COMPOUNDS

Max Duennenberger, Birsfelden, Franz Ackermann, Binningen, and Adolf-Emil Siegrist, Basel, Switzerland, assignors to Ciba Limited, Basel, Switzerland, a Swiss firm No Drawing. Application June 14, 1956
Serial No. 591,269

9 Claims. (Cl. 260—240)

This invention is based on the observation that α:β-di-[aryloxazolyl-(2)]-ethylene compounds can be made in an especially advantageous manner by condensing two molecular proportions of an ortho-hydroxy-aminoaryl compound at a raised temperature with one molecular proportion of fumaric acid, malic acid or aspartic acid or a functional derivative of one of these acids and, without separating the condensation product, bringing about ring closure to form the di-oxazolyl compound with the aid of a catalyst, and, when malic acid or aspartic acid is used as starting material, splitting off water or ammonia from the radical of these acids.

The ortho-hydroxy-aminoaryl compounds used as starting materials may belong, for example, to the naphthalene series or advantageously to the benzene series, and there are advantageously used monocyclic ortho-hydroxy-aminoaryl compounds of the benzene series. These compounds may contain, in addition to the ortho-hydroxy-aminoaryl grouping further substituents, for example, lower alkyl or alkoxy groups such as ethyl, methyl, ethoxy or methoxy groups, or halogen atoms, such as chlorine, or nitro groups. As examples there may be mentioned the following ortho-hydroxy-arylamino compounds:

1-amino-2-hydroxynaphthalene,
1-amino-2-hydroxybenzene,
1-amino-2-hydroxy-5-methylbenzene,
1-amino-2-hydroxy-4-methylbenzene,
1-amino-2-hydroxy-5-methoxybenzene,
1-amino-2-hydroxy-3:5-dimethylbenzene,
1-amino-2-hydroxy-5-tertiary butyl-benzene,
1-amino-2-hydroxy-4- or 5-nitrobenzene,
1-amino-2-hydroxy-5-chlorobenzene,
1-amino-2-hydroxy-3:5-dichlorobenzene.

The other starting material used in the present process is fumaric acid, malic acid or aspartic acid or a functional derivative of one of these acids, for example, a mono ester or diester thereof. Among the esters of the aforesaid dicarboxylic acids there may be used, more especially, those having alkanol radicals of low molecular weight, for example, the dimethyl ester or diethyl ester of fumaric acid. Thus there are used as starting materials preferably the dicarboxylic acids and dialkyl esters of the formula $$H_{2m-1}-C_{m-1}-O-C-R-C-O-C_{m-1}-H_{2m-1}$$
$$\qquad\qquad\qquad \| \quad \|$$
$$\qquad\qquad\qquad O \quad O$$

in which R represents a radical of the composition

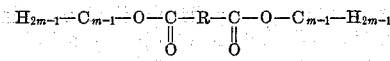

$m$ and $n$ each indicating a whole number of at the most 3 and each carbon atom of R being bound to one of the —CO—groups ($m=1$: free acid; $m=2$: dimethyl ester; $m=3$: diethyl ester; $n=1$: fumaric acid; $n=2$: malic acid; $n=3$: aspartic acid). With the aid of the catalyst a compound of the composition

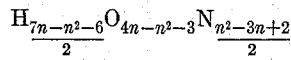

is split out from $R_3$, viz. $H_2O$ in the case of malic acid ($n=2$) and $NH_3$ in the case of aspartic acid; in the case of fumaric acid ($n=1$) the —CH=CH—group is already present in R and no splitting out takes place from this radical.

The condensation of the ortho-hydroxy-aminoaryl compounds with the dicarboxylic acids or functional derivatives thereof is carried out in the molecular ratio 2:1. It is therefore desirable to use the starting materials in approximately these relative proportions and preferably to use a small excess of the dicarboxylic acid rather than of the ortho-hydroxy-aminoaryl compound. In this manner undesired by-products and losses of starting materials are avoided to a very great extent.

For carrying out the reaction it is only necessary to use the two starting materials and the catalyst mentioned above, and the reaction can be initiated by simple heating of the mixture of starting materials and brought to an end with the aid of the catalyst. However, it is also possible and in some cases of advantage to work in an inert organic solvent. As the reaction is carried out at a raised temperature it is preferable to use a high boiling solvent, for example, a substitution product of benzene such as monochlorobenzene, a dichlorobenzene, a trichlorobenzene or nitrobenzene or especially high boiling hydrocarbons of the benzene series such as toluene, a xylene or cumene. Advantageously the temperature used in the first or second stage of the process (which may emerge into one another as explained below) is within the range of about 100–200° C. It is of advantage to work at the boiling point in one of the aforesaid solvents, to separate the reaction water from the distilled solvent by means of a water separator and to return the solvent to the reaction mixture.

In the present process there are used catalysts which are capable of bringing about the elimination of water necessary for ring closure to form the oxazole rings, and which, when necessary, that is to say, when the starting material unlike fumaric acid or a derivative thereof does not contain an ethylene bond, namely malic acid or aspartic acid or a derivative thereof is used, are capable of eliminating water or ammonia from the radical of the dicarboxylic acid. Suitable catalysts of this kind are, for example, sulfonic acids of the benzene series such as para-toluene sulfonic acid, and especially good results are obtained by using boric acid as catalyst.

In the reaction of ortho-hydroxy-aminoaryl compounds with acids of the above kind the elimination of water takes place without a catalyst. Accordingly, there is good reason to suppose that the dicarboxylic acid first reacts with the amino-compound to form a dicarboxylic acid di-(ortho-hydroxy-arylamide), from which, with the aid of the catalyst, a further two molecules of water are eliminated in the case of fumaric acid, three further molecules of water are eliminated in the case of malic acid and two further molecules of water and one molecule of ammonia in the case of aspartic acid, with the formation of the desired α:β-di-[benzoxazolyl-(2)] - ethylene compound. Accordingly, in the present process the elimination of water may first be carried out without a catalyst, when this is possible, and then the catalyst may be added for completing the eliminations. Alternatively, the catalyst may be present from the outset, which is especially advantageous when the reaction is carried out in the absence of a solvent.

When the reactions are finished the resulting α:β-di-

[benzoxazolyl-(2)]-ethylene compound is isolated from the reaction mixture by a method in itself known, and for further purification it may be recrystallized from an organic solvent.

α:β-Di-[benzoxazolyl-(2)]-ethylene compounds can be made by the present process much more easily and in a purer state than in accordance with known methods by heating ortho-hydroxy-aminoaryl compounds with succinic acid and then dehydrogenating, or by melting ortho-hydroxy-aminoaryl compounds with fumaric acid without a catalyst.

The following examples illustrate the invention, the parts and percentages being by weight unless otherwise stated, and the relationship of parts by weight to parts by volume being the same as that of the kilogram to the liter:

*Example 1*

123 parts of 1-amino-2-hydroxy-5-methylbenzene and 67 parts of malic acid are stirred at the boil in 700 parts by volume of xylene with the exclusion of air, water formed being distilled off continuously. After distilling off 18 parts of water, 3–4 parts of para-toluene sulfonic acid are added, and further water is distilled off at the boiling point, while stirring, until the formation of water ceases, which takes 24–36 hours. The mixture is allowed to cool and the precipitated crystalline condensation product is filtered off and washed with xylene, alcohol and water. After being recrystallized from a mixture of methylene chloride and alcohol, the fine yellowish needles of the resulting condensation product of the formula

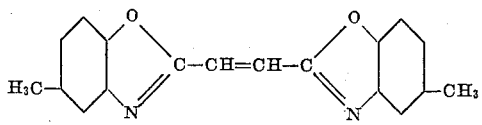

melt at 183–184° C.

*Example 2*

109 parts of 1-amino-2-hydroxybenzene and 67 parts of malic acid in 700 parts by volume of xylene are maintained for one hour under reflux with the exculsion of air, while stirring, the water formed being distilled off continuously. Then 3 parts of boric acid are added, and the reaction mixture is refluxed for a further 6–8 hours until the formation of water ceases. The brown reaction solution is cooled to 10° C., whereupon the condensation product of the formula

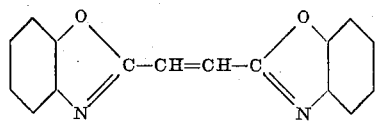

separates in crystalline form and in good yield. The product is filtered off, washed with xylene and alcohol and recrystallized from dioxane, and then melts at 242–243° C.

*Example 3*

123 parts of 1-amino-2-hydroxy-5-methylbenzene and 66.5 parts of d:l-aspartic acid are refluxed with the exclusion of air in 700 parts by volume of xylene with the addition of 20 parts of boric acid, while stirring, and the water formed is distilled off continuously. As soon as the elimination of water has ceased, which takes about 12–24 hours, the mixture is cooled, and the precipitated crystalline product is filtered off, washed with xylene, ethanol and hot water and dried. After recrystallization from a mixture of methylene chloride and alcohol the resulting α:β-di-[5-methyl-benzoxazolyl - (2)] - ethylene melts at 183–184° C.

By using, instead of 123 parts of 1-amino-2-hydroxy-5-methylbenzene, 109 parts of 1-amino-2-hydroxybenzene or 143.6 parts of 1-amino-2-hydroxy-5-chlorobenzene, there is obtained α:β-di-[benzoxazolyl-(2)]-ethylene melting at 242–243° C. after recrystallization from dioxane, or α:β-di-[5-chlorobenzoxazolyl-(2)]-ethylene in the form of a crystalline powder melting at 262–263° C. after recrystallization from dioxane.

*Example 4*

13.7 parts of 2:4-dimethyl-6-aminophenol, 6.7 parts of malic acid and 0.2 part of boric acid are refluxed in 100 parts by volume of xylene for 6 hours with the exclusion of air, and the water formed is separated continuously in a water separator. The xylene is then distilled off in vacuo and the residue is recrystallized from hot alcohol. The yellow-orange needles so obtained have the formula

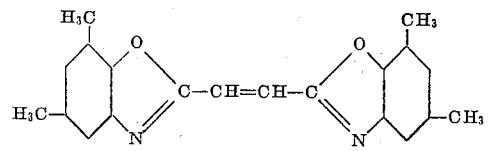

and melt at 213–215° C.

Alternatively, the boric acid may be added only towards the end of the reaction or may be omitted altogether.

*Example 5*

86 parts of 1-amino-2-hydroxy-5-methylbenzene are stirred in the absence of air with 47 parts of malic acid in 500 parts by volume of xylene. The mixture is stirred under reflux for one hour, the elimination of water starting immediately. Subsequently 2 parts of boric acid are added, and the reaction mixture is refluxed for a further 3 hours. The dark red solution is cooled to 10° C., whereupon the condensation product of the formula

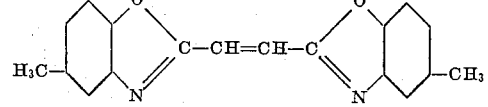

separates in good yield in the form of fine yellowish needles melting at 179–180° C. After recrystallization from isopropanol the melting point of the product rises to 183–184° C.

The same final product can be obtained by adding the boric acid to the reaction mixture at the outset.

Instead of xylene, cumene may be used.

*Example 6*

17.2 parts of fumaric acid diethyl ester, 24.6 parts of 1-amino-2-hydroxy-5-methylbenzene and 0.4 part of boric acid are heated at 150° C. for 7 hours with the exclusion of air, during which 9 parts of a mixture of alcohol and water separate. When recrystallized from a mixture of methylene chloride and methanol the condensation product of the formula

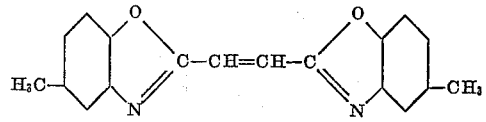

melts at 181–183° C.

The same final product is obtained by using fumaric acid or malic acid, instead of fumaric acid diethyl ester.

*Example 7*

6.1 parts of 1-amino-2-hydroxy-4-methylbenzene are stirred under reflux for 5 hours with the exclusion of air with 3.4 parts of malic acid in 50 parts by volume of xylene with the addition of 0.1 part of boric acid. The xylene is then distilled off in vacuo and the residue is recrystallized from a mixture of methylene chloride and methanol, whereby yellow needles melting at 190–191°

C. are obtained, which have the following constitutional formula

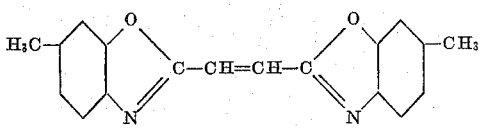

Example 8

2.65 parts of 1-amino-2-hydroxy-5-tertiary-butyl-benzene are stirred under reflux for 7 hours with the exclusion of air with 1.1 parts of malic acid in 40 parts by volume of xylene with the addition of 0.05 part of boric acid. The xylene is then removed by distillation in vacuo and the condensation product of the formula

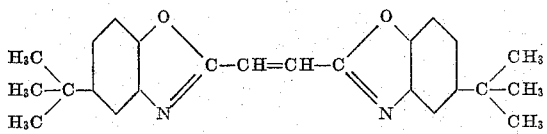

melts at 157–158° C. after recrystallization from a mixture of methylene chloride and methanol.

What is claimed is:

1. Process for the manufacture of α:β-di-[benzoxazolyl-(2)]-ethylene compounds which comprises condensing, at a temperature ranging from about 100 to 200° C., two molecular proportions of (a) an ortho-hydroxy-aminobenzene of the formula

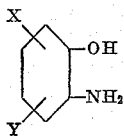

in which X represents a member selected from the group consisting of a hydrogen atom and a lower alkyl group, and Y represents a member selected from the group consisting of a hydrogen atom, a lower alkyl group and a chlorine atom, with one molecular proportion of (b) a compound selected from the group consisting of fumaric acid, malic acid, aspartic acid and the dimethyl and diethyl esters of these acids, without separating the condensation product, which process also comprises subjecting the latter to ring closure at a temperature ranging from about 100 to 200° C., and in the presence of a catalyst selected from the group consisting of a mononuclear carbocyclic sulfonic acid and boric acid to form the di-oxazolyl compound, this reaction being continued until the formation of the oxazole rings and the formation of the ethylene group connecting the oxazole rings are complete.

2. Process according to claim 1, wherein compound (b) is malic acid and the catalyst is a mononuclear carbocylic sulfonic acid, and the ring closure reaction is continued until the formation of the oxazole rings is practically complete and splitting off water from the —CHOH—CH₂—group of the malic acid radical practically ceases.

3. Process according to claim 1, wherein compound (b) is malic acid and the catalyst is boric acid, and the ring closure reaction is continued until the formation of the oxazole rings is practically complete and splitting off water from the —CHOH—CH₂—group of the malic acid radical practically ceases.

4. Process according to claim 1, wherein compound (b) is fumaric acid and the catalyst is boric acid, and the ring closure reaction is continued until the formation of the oxazole rings is practically complete.

5. Process for the manufacture of α:β-di-[5-methyl benzoxazolyl-(2)]-ethylene, which comprises condensing at a temperature ranging from 100 to 200° C. two molecular proportions of 1-amino-2-hydroxy-5-methylbenzene with one molecular proportion of malic acid, without separating the condensation product, and subjecting the latter to ring closure at a temperature ranging from 100 to 200° C. and in the presence of para-toluene sulfonic acid as a catalyst, to form the di-oxazolyl compound, this treatment being continued until the formation of the oxazole rings is practically complete and splitting off water from the —CHOH—CH₂-group of the malic acid radical practically ceases.

6. Process for the manufacture of α:β-di-[benzoxazolyl-(2)]-ethylene, which comprises condensing at a temperature ranging from 100 to 200° C. two molecular proportions of 1-amino-2-hydroxybenzene with one molecular proportion of malic acid, without separating the condensation product, and subjecting the latter to ring closure at a temperature ranging from about 100 to 200° C. and in the presence of boric acid as a catalyst, to form the di-oxazolyl compound, this treatment being continued until the formation of the oxazole rings is practically complete and the splitting off of water from the CHOH—CH₂-group of the malic acid radical practically ceases.

7. Process for the manufacture of α:β-di-[5-methyl-benzoxazolyl-(2)]-ethylene, which comprises condensing at a temperature ranging from 100 to 200° C. two molecular proportions of 1-amino-2-hydroxy-5-methylbenzene with one molecular proportion of malic acid, without separating the condensation product, and subjecting the latter to ring closure at a temperature ranging from 100 to 200° C. and in the presence of boric acid as a catalyst, to form the dioxazolyl compound, this treatment being continued until the formation of the oxazole rings is practically complete and the splitting off of water from the —CHOH—CH₂-group of the malic acid radical practically ceases.

8. Process for the manufacture of α:β-di-[6-methyl-benzoxazolyl-(2)]-ethylene, which comprises condensing at a temperature ranging from 100 to 200° C. two molecular proportions of 1-amino-2-hydroxy-4-methylbenzene with one molecular proportion of malic acid, without separating the condensation product, and subjecting the latter to ring closure at a temperature ranging from about 100 to 200° C. and in the presence of boric acid as a catalyst, to form the di-oxazolyl compound, this treatment being continued until the formation of the oxazole rings is practically complete and the splitting off of water from the —CHOH—CH₂-group of the malic acid radical practically ceases.

9. Process for the manufacture of α:β-di-[5-methyl-benzoxazolyl-(2)]-ethylene, which comprises condensing at a temperature ranging from 100 to 200° C. two molecular proportions of 1-amino-2-hydroxy-5-methylbenzene with one molecular proportion of fumaric acid, without separating the condensation product, and subjecting the latter to ring closure at a temperature ranging from about 100 to 200° C. and in the presence of boric acid as a catalyst, to form the di-oxazolyl compound, this treatment being continued until the formation of the oxazole rings is practically complete.

References Cited in the file of this patent

UNITED STATES PATENTS

| | | |
|---|---|---|
| 2,463,264 | Graenacher et al. | Mar. 1, 1949 |
| 2,483,392 | Meyer et al. | Oct. 4, 1949 |
| 2,488,094 | Graenacher et al. | Nov. 15, 1949 |

OTHER REFERENCES

Medinger: Journ. für Prakt. Chem., vol. 86 (second series), pages 345–359 (1912).

Ladenburg: Deutsche Chemische Gesellschaft, vol. 9, part 2, pages 1524–30 (1876); vol. 10, pages 1123–1126 (1877).